United States Patent [19]
Cook

[11] 4,040,099
[45] Aug. 2, 1977

[54] METHOD AND APPARATUS FOR PREPARING RECORDED PROGRAM MATERIAL TO RENDER DETECTABLE UNAUTHORIZED MAGNETIC TAPE DUPLICATIONS, AND METHOD AND APPARATUS FOR DETECTING SUCH DUPLICATIONS

[75] Inventor: Emory G. Cook, Wilton, Conn.

[73] Assignee: Cook Laboratories, Inc., Norwalk, Conn.

[21] Appl. No.: 600,454

[22] Filed: July 30, 1975

[51] Int. Cl.[2] .......................... G11B 5/02; G11B 5/86

[52] U.S. Cl. ........................................ 360/29; 360/15; 360/30

[58] Field of Search ........................ 360/15, 17, 29, 30

[56] References Cited

U.S. PATENT DOCUMENTS

| | | | |
|---|---|---|---|
| 2,622,155 | 12/1952 | Dutton | 360/15 |
| 2,774,056 | 12/1956 | Stafford et al. | 360/15 |
| 3,070,670 | 12/1962 | Eldridge et al. | 360/15 |
| 3,072,753 | 1/1963 | Goldberg | 360/15 |
| 3,298,006 | 1/1967 | Milenkovic et al. | 360/15 |
| 3,551,608 | 12/1970 | Balint | 360/15 |

*Primary Examiner*—Vincent P. Canney
*Attorney, Agent, or Firm*—Parmelee, Johnson & Bollinger

[57] ABSTRACT

Unauthorized duplication of recorded program material upon magnetic tape, commonly known as tape piracy, is rendered detectable by the present method and apparatus for preparing the program material. The method and apparatus prepare recorded audible program material by eliminating narrow low and high frequency bands of signals from the program material, inserting a preselected low frequency signal in the low frequency band, modulating a predetermined high frequency signal with the low frequency signal, and inserting the modulated high frequency signal in the high frequency band. Subsequent copying of the recorded program material having these inserted signals will introduce a phase shift between the low and high frequency inserted signals.

Such a phase shift is detected by a method and apparatus which recover the signal recorded upon the magnetic tape recording suspected to be a duplicate, and filter the recovered signal to detect signals within the high and low frequency bands. Signals in the high frequency band are demodulated, and the low frequency signal obtained upon demodulation has its phase compared with the phase of the signal from the low frequency band to detect phase shifts therebetween arising upon duplication with conventional magnetic tape recording equipment. The inserted signals may be coded in a fashion identifying the origin of the program material, or may be inserted during the presence of program material with suitable masking properties. The low frequency signal may itself be modulated to prevent its discrete erasure by the tape pirate.

39 Claims, 4 Drawing Figures

METHOD AND APPARATUS FOR PREPARING RECORDED PROGRAM MATERIAL TO RENDER DETECTABLE UNAUTHORIZED MAGNETIC TAPE DUPLICATIONS, AND METHOD AND APPARATUS FOR DETECTING SUCH DUPLICATIONS

BACKGROUND OF THE INVENTION

This invention relates to the recording of program materials such as speech or music, and particularly to the recording of program materials which are susceptible to unauthorized duplication or copying using the medium of magnetic tape.

Unauthorized copying or duplication of program material sold by publishers or their licensees is widespread in spite of its illegality and is difficult to police effectively because unauthorized duplicates cannot now be readily distinguished from genuine originals. The result of such copying is to cut seriously into publishers' revenues and to discourage production of expensive, high quality programs. Tape cassettes, in particular, account for most of this activity.

Accordingly, a need exists for techniques and equipment for preparing the original recordings of the program material to leave readily detectable traces or "fingerprints" on the copies which alter upon copying and thus will supply irrefutable proof of the fact that unauthorized copies have been made.

Any technique for preparing original recorded program material to permit detection of magnetic tape duplicates should satisfy several criteria. The technique should be simple to use and accomplished with economical equipment. In addition, the technique should not interfere with normal playback of the material by the possessor of an authorized recording. Moreover, the technique should be one that is difficult for a tape pirate to nullify or sidestep except at an unrewarding cost. Finally, the technique should permit ready and sure identification of a tape recording as an unauthorized copy again without requiring complicated procedures or inordinately expensive equipment.

Heretofore, no techniques or devices have been developed which meet the foregoing criteria satisfactorily.

SUMMARY OF THE INVENTION

It is a principal object of this invention to provide an improved method and apparatus for preparing recorded program material so as to be able to detect any unauthorized copies made by magnetic tape recording. It is a further principal object of the invention to provide an improved method and apparatus for analyzing tape recordings to detect unauthorized copies of program material so prepared. It is a specific object of the invention to provide such methods and apparatuses which are simple and economical, which do not interfere with normal playback of the authorized originals, which are difficult for a tape pirate to nullify, and which permit ready detection of unauthorized magnetic tape recording duplications. Still another object of the invention is to provide methods and apparatuses of the type described which are more suitable for commercial use.

In attaining the foregoing objects, the present invention recognizes and takes advantage of a phase shifting property inherent in conventional magnetic tape duplicating and reproducing equipment. Duplicating hardware now in use introduces, inescapably, approximately a 90° phase shift between low frequency recorded material (near or below 100 Hertz) and high frequency recorded material (from 1,000 Hertz on to the high frequency end of the transmission band). A duplicated tape thus will display a phase relation delay between highs and lows when compared with the original from which it was copied. This is the equivalent of stating in electrical terms that in the real world time cannot be caused to run backwards, and such a phase shift cannot occur accidentally in the original recording. Thus one knows that the existence of such a phase shift between high and low frequency signals identifies, irrefutably, a tape recording as an unauthorized duplicate.

In a preferred embodiment of the invention to be described hereinbelow in detail, audible program material is prepared by a method and apparatus which eliminate both a low frequency band of signals and a high frequency band of signals from the program material signal. A predetermined low frequency signal is generated and inserted in the low frequency band. A predetermined high frequency signal is first modulated, e.g. frequency modulated, with the low frequency signal and then the modulated high frequency signal is inserted in the high frequency band. The program material, with the inserted high and low frequency signals, is then recorded. Subsequent copying of the recorded material onto magnetic tape will produce phase shifts between the inserted low and high frequency signals.

Such phase shifts are detected with a method and apparatus which first recover the signal recorded upon a suspected tape, and then filter the recovered signal to obtain those signals which are within the high and low frequency bands. The signals in the high frequency band are demodulated and the low frequency signal obtained upon demodulation is compared in phase with the low frequency signal within the low frequency band to detect phase shifts therebetween arising upon duplication. Such phase shifts are readily detected by comparing the signals with an oscilloscope display, the phase shifts appearing as characteristic traces upon the cathode ray tube.

In further detail, the low frequency signal is itself modulated to prevent filtering, and the low and high frequency signals are inserted either in accordance with an identifying code, or during the presence of program materials suitable for aubibly masking the inserted signals.

Other objects, aspects and advantages of the invention will be pointed out in, or apparent from, the detailed description hereinbelow, considered together with the following drawings.

DESCRIPTION OF THE PREFERRED EMBODIMENTS

Figure 1:
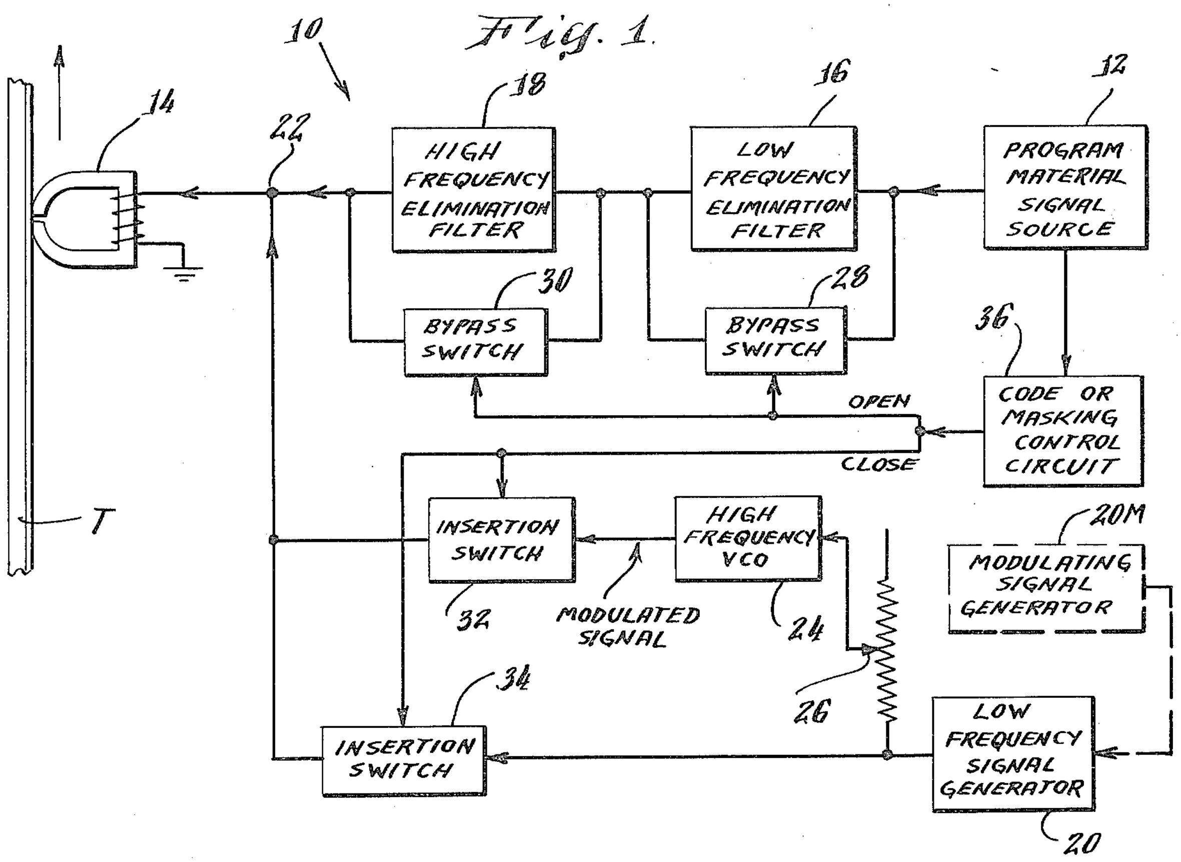
FIG. 1 is a schematic diagram of apparatus for preparing recorded program material in accordance with the present invention.

FIG. 1 illustrates in schematic form a recording apparatus 10 arranged in accordance with the present invention to prepare recorded audible program material upon a magentic tape T so that unauthorized copies of the recorded program material which subsequently are made by magnetic tape recording will be rendered detectable. In recording apparatus 10, the program material signal, obtained from a source 12, is recorded on tape T by means of a conventional recording head 14 driven by a conventional recording circuit receiving conventional bias (not shown).

In accordance with the present invention, the program material signal passes through a low frequency band elimination filter 16 and a high frequency band elimination filter 18. The low frequency band may be for example, from 70 to 100 Hertz, and the high frequency band may be, for example, from 6,000 to 7,000 Hertz.

As illustrated in FIG. 1, recording apparatus 10 further includes a low frequency signal generator 20 producing a signal at a frequency within the low frequency band established by filter 16 and arranged to be inserted into the program material signal at a summing point 22. A high frequency signal is also delivered to summing point 22 from a modulated signal generator 24 having a quiescent frequency within the high frequency band established by filter 18, and comprising, for example, an FM voltage controlled oscillator. The modulated high frequency generator 24, which may produce either amplitude or frequency modulation, receives as its modulating signal the low frequency signal from generator 20, with the amplitude of the modulating signal being adjusted through an amplitude adjustment means 26. When the modulated high frequency generator 24 is arranged to provide a frequency modulated signal, the adjustment means 26 determines the modulation index and the modulation spectrum of the high frequency modulated signal. The low frequency signal from generator 20 may be, for example, a sinusoidal signal of 100 Hertz and the high frequency modulated signal from generator 24 may be a sinusoidal signal with a spectrum, for example, of 6,200 to 6,800 Hertz.

The low frequency signal from generator 20 may itself be modulated in order to prevent a prospective pirate from filtering it out. The generator 20 then may comprise a modulated signal generator such as a voltage controlled oscillator, receiving a modulating signal from another generator 20M having a modulating frequency of, e.g., 10 Hertz.

Filters 16 and 18 are switched into operation by the opening of bypass switches 28 and 30, and the high and low frequency signals from generators 20 and 24 are connected with summing point 22 by the closing of insertion switches 32 and 34. The bypass switches 28, 30 and the insertion switches 32, 34 are under the common control of a circuit 36, which concurrently filters the program material and inserts the phase-related high and low frequency signals from generators 20 and 24 in accordance with a desired control scheme. The control circuit 36 may control the signal insertion in accordance with a code, such as Morse International Code dots and dashes, to spell out an identifying piece of information such as the initials of the publisher. The control circuit 36 also may supply control designed to insure that the inserted signals will not intrude upon the listener's enjoyment of the program material by developing switching signals which allow insertion whenever the program material signal from source 12 has an appropriate amplitude and frequency to permit masking of the inserted signals by the program material. A masking control circuit suitable for this purpose will be described below with reference to FIGS. 3 and 4.

The phase-related high and low frequency signals from generators 20 and 24 maintain their phase relationship when recorded upon tape T by recording head 14. However, when tape T is used to prepare an unauthorized duplicate tape T*d,* there will arise a phase shift of about 90° between the inserted high and low frequency signals on the duplicate tape T*d.* FIG. 2 illustrates in schematic form a detection apparatus 50 arranged in accordance with the present invention to analyze magentic tape recordings to determine if they are magnetically recorded duplicates of tapes prepared in accordance with the method and apparatus of FIG. 1.

Figure 2:
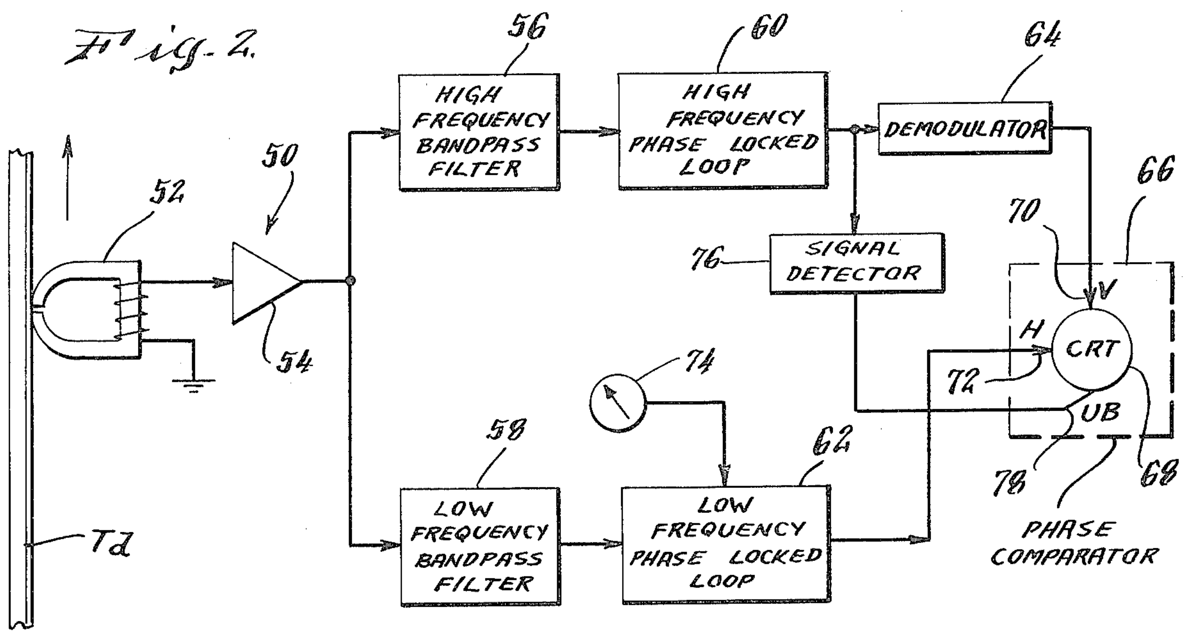
FIG. 2 is a schematic diagram of apparatus for detecting phase shifts in magnetic tapes copied from program material prepared with the apparatus of FIG. 1.

As shown in FIG. 2, detection apparatus 50 recovers the signal recorded upon magnetic tape Td by means of a conventional playback head 52 and a conventional playback amplifier 54. The recovered signal then is filtered by high and low frequency band pass filters 56 and 58, arranged to pass bands of frequencies corresponding to those eliminated by filters 16 and 18. The signals within the high frequency band drive a high frequency phase locked loop circuit 60 which operates at the frequency of the high frequency signal from generator 24. Similarly, low frequency signals within the band passed by filter 58 drive a low frequency phase locked loop circuit 62 operating at the frequency of the low frequency signal inserted from generator 20.

The high frequency signal obtained from the phase locked loop circuit 60 is demodulated in a demodulator 64 to obtain a second low frequency signal which will be phase displaced from the low frequency signal obtained from phase locked loop circuit 62 as a result of the duplicating process. The two low frequency signals are applied to a phase comparator 66 in order to detect the existence of the phase shift arising upon duplication.

Phase comparator 66 preferably is a cathode ray tube oscilloscope 68 having the signal from demodulator 64 applied to one deflection circuit input, e.g. the vertical input 70, and the signal from phase locked loop circuit 62 applied to the other deflection circuit input, e.g., the horizontal input 72. The cathode ray tube oscilloscope then will display traces or figures, e.g., Lissajous figures. The typical phase shift arising upon duplicating will be displayed on oscilloscope 68 as a first order Lissajous figure, oval in shape.

Calibration of the cathode ray tube oscilloscope 68 is accomplished by a phase calibration control 74 which is provided on phase locked loop circuit 62 and which is adjusted during analysis of an authentic tape T to provide an indication of zero phase shift on oscilloscope 68. Where a control circuit 36 is used to provide intermittent insertion of the high and low frequency phase-related signals, a signal detector 76 may be used to detect the presence of the inserted signal both for decoding purposes and to supply a control signal to the unblanking input 78 of the oscilloscope 68, thereby confining the cathode ray tube display to information of interest.

Figure 3:
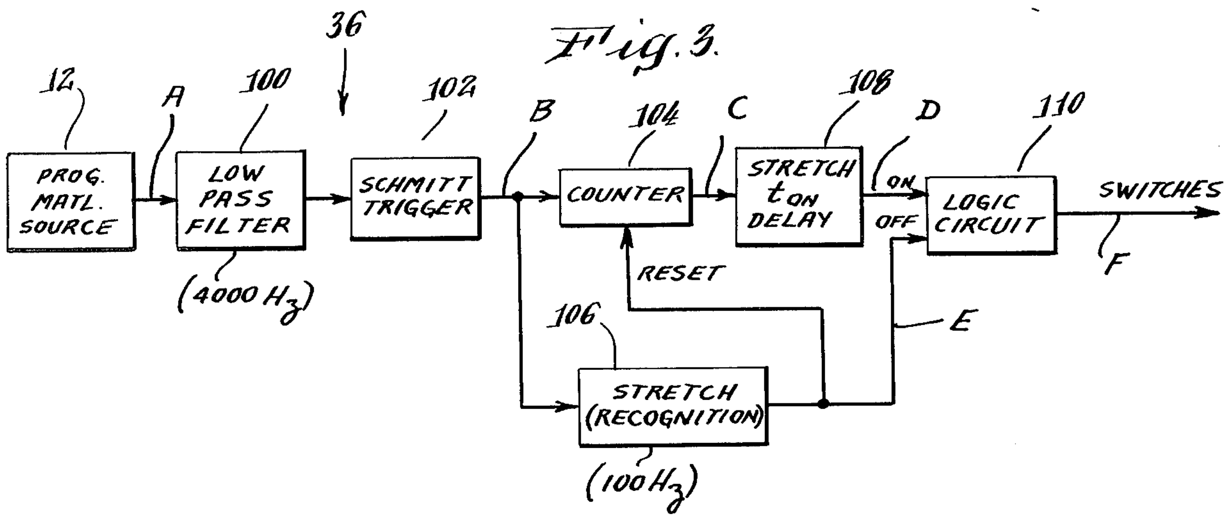
FIG. 3, *a* through F, is a schematic diagram illustrating the masking control portion of the apparatus of FIG. 1.

A masking control circuit 36 for recording apparatus 10 is shown in schematic form in FIG. 3. The purpose of the circuit is to recognize program material sound bursts with adequate masking properties, and to generate a switching signal tailored to such bursts to allow the high and low frequency signals from generators 20 and 24 to make unnoticed incursions into the program material. Such incursions are impossible for a pirate to remove and thus provide effective protection against copying.

Masking control circuit 36 is arranged to detect signal burst in the frequency range of 1,000 – 4,000 Hertz, to which the human ear is most sensitive, and to detect such signal bursts which have sufficient duration to allow for masking. The circuit is arranged, moreover, to delay the start of the switching signal for a time $T_{on}$ after the beginning of a signal burst to allow the sensitivity of the listerner's ear to adjust to the signal burst before inserting the phase related high and low signals.

Accordingly, masking control circuit 36 comprises an input low pass filter 100 removing frequencies above 4,000 Hertz, a Schmitt trigger 102 with its threshhold set at an amplitude level suitable for masking, and a counter 104 arranged to distinguish an appropriate signal burst from random noise by producing an output when a desired number of successive cycles of speech or music, e.g. 12 pulses, has been counted. Counter 104 is reset by a signal from a pulse stretching circuit 106 which is arranged to have no output as long as input signals are received with sufficient frequency, and to develop an output whenever too much time elapses between successive pulses from Schmitt trigger 102, a condition which signifies either that the signal burst is over, or that the signal has too low a frequency to be useful for masking. The pulse stretching circuit 106, accordingly, has its duration arranged to provide an output when it receives signals of 1,000 Hertz or less.

The presence of a recognized signal burst qualified for masking is thus an output from counter 104. This output starts a pulse stretching delay circuit 108, which produces a delayed output $T_{on}$ seconds thereafter, and maintains the output as long as the input is present. The output from delay circuit 108 goes to logic circuit 110, the output of which controls switches 28, 30 and 32, 34. The end of a signal burst, signified by an output from pulse stretching circuit 106 sent to logic circuit 110, controls the switches to end the insertion of the high and low frequency signals into the program material signal. The time $T_{on}$ may be, for example, 0.03 seconds.

Figure 4:
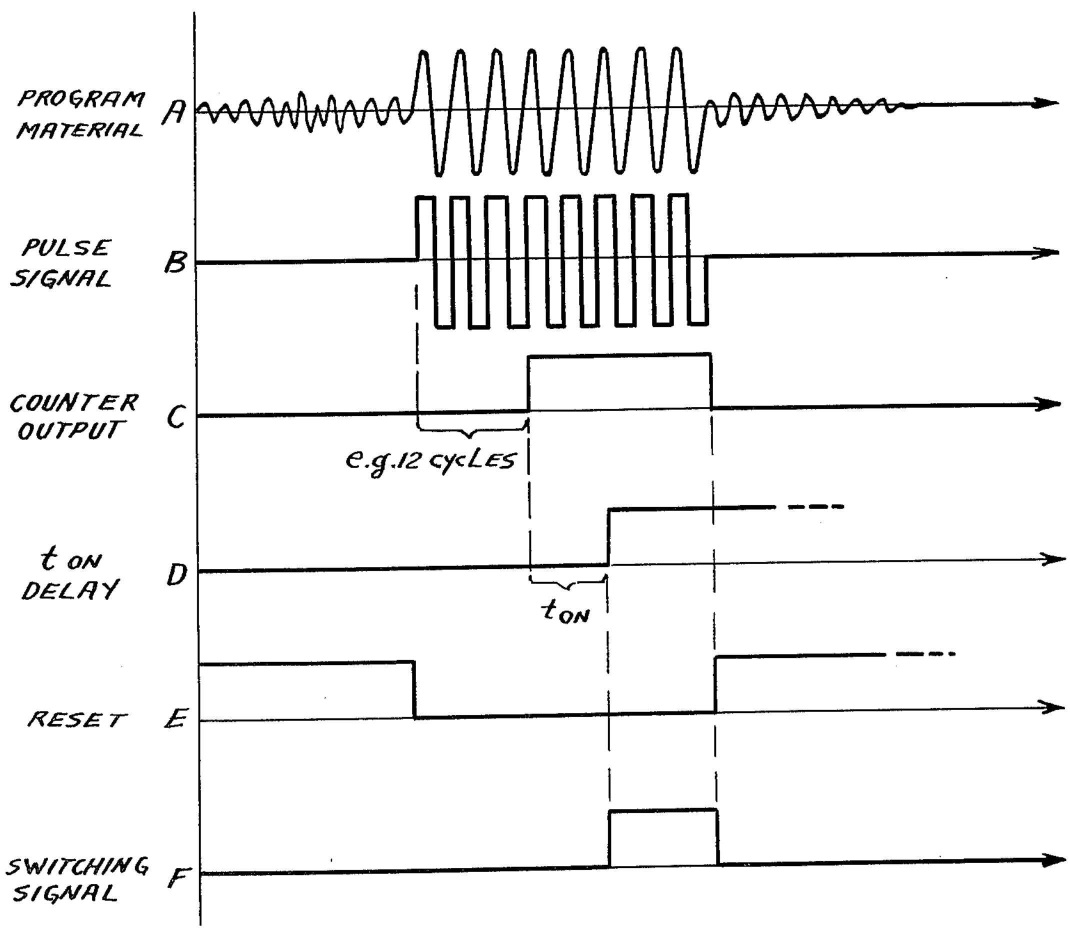
FIG. 4, *a* through F, is a graph illustrating wave forms appearing in the masking control circuit of FIG. 3.

Wave forms illustrating the operation of masking control circuit 36 are shown in FIG. 4 for a signal burst which qualifies for masking. As shown there, a switching signal is developed which starts $T_{on}$ seconds after the beginning of output from counter 104 and ends at the end of signal burst.

In some instances, a program material to be recorded inherently contains signals which may be used as components of the high and low frequency phase-related signals which the present invention incorporates within the program material. For example, the audio portion of audio visual presentations commonly employs frame change signals for synchronization. Such a brief tone or "bong" may be used to form the high or low frequency signal, thus eliminating the need for band elimination filters. A second type of synchronization signal is the frame change signal sometimes called the Dukane pulse, which records a 50 Hertz signal for 0.5 seconds. Such a signal may be accompanied by a high frequency signal modulated thereby. Should a pirate utterly filter out the original 50 Hertz signal and reinsert it freshly, phase relationships will be uncoordinated on a random basis, thus also signifying the presence of an unauthorized duplicate.

In addition, while recording apparatus 10 is shown with a single high frequency generator 24, a plurality of high frequency generators operating at different quiescent frequencies and all modulated by the low frequency signal, may be employed. Easy identification of unauthorized duplicates arises if the cross modulation products between the two high frequencies lie in the broad middle frequency range of human ear sensitivity.

Moreover, although recording apparatus 10 operates by adding sine wave signals to the program material signal, other ways of applying phase-related signals to the program material signal are possible. For example, voltage controlled filters operating upon the program material in response to a low frequency signal will produce desired phase-related high and low frequency components of the program material signal. Phase shifts arising upon copying can be detected by subsequently phase comparing an amplitude demodulated signal obtained from a decoding high pass filter of a shape similar to that imposed by the voltage control filter.

Although specific embodiments of the invention have been disclosed herein in detail, it is to be understood that this is for the purpose of illustrating the invention and should not be construed as necessarily limiting the invention since it is apparent that many changes can be made to the disclosed structures by those skilled in the art to suit particular applications.

I claim:

1. A method for preparing recorded program material which does not interfere with normal playback of the material but which renders detectable any unauthorized copies of the material which are made by conventional magnetic tape recording equipment introducing a phase shift between low and high frequency signals, said method comprising:

eliminating a low frequency band of signals from the program material signal;

generating and inserting a predetermined low frequency signal is said low frequency band;

eliminating a high frequency band of signals from the program material signal;

generating a predetermined high frequency signal in the high frequency band;

modulating the predetermined high frequency signal with said low frequency signal;

inserting the modulated high frequency signal in the high frequency band; and recording the program material with the inserted high and low frequency signals;

whereby copying of the recorded material onto magnetic tape will produce on the tape detectable phase shifts between the inserted low frequency signal, and a low frequency signal obtained by demodulating the high frequency signal.

2. A method as claimed in claim 1 further comprising modulating the low frequency signal to prevent filtering thereof, and modulating the high frequency signal with the modulated low frequency signal.

3. A method as claimed in claim 1 wherein the high frequency signal is frequency modulated with the low frequency signal.

4. A method as claimed in claim wherein the high frequency signal is amplitude modulated with the low frequency signal.

5. A method as claimed in claim 1 wherein said high and low frequency bands of signals are within the audible passband of the program material.

6. A method as claimed in claim 5 further comprising sensing the presence of program materials suitable for audibly masking the inserted low and high frequency signals, and inserting the low and high frequency signals during such masking program material.

7. A method as claimed in claim 1 wherein the step of inserting the high and low frequency signals comprises generating a coded signal carrying preselected information and inserting the high and low frequency signals in response to the coded signal, whereby the coded information will be communicated in the form of recognizable phase shifts to the tape copy to identify the origin of the recorded program material.

8. A method as claimed in claim 1 further comprising eliminating a second band of high frequency signals from the program material signal; generating a second predetermined high frequency signal and modulating the second high frequency signal with the low frequency signal, and inserting the modulated second high frequency signal in the second high frequency band.

9. A method as claimed in claim 1 wherein the low frequency signal is in the vicinity of 100 Hertz or below and the high frequency signal is in the vicinity of 1,000 Hertz or above.

10. A method for preparing recorded program material which does not interfere with normal playback of the material but which renders detectable any unauthorized copies of the material which are made by conventional magnetic tape recording equipment introducing a phase shift between low and high frequency signals, said method comprising:

generating a predetermined low frequency signal;

generating a predetermined high frequency signal modulated by said low frequency signal; and applying the low frequency signal and high frequency modulated signal to the program material signal to obtain phase related high and low frequency portions thereof to be recorded;

whereby copying of the recorded material onto magnetic tape will produce on the tape detectable phase shifts between the high and low frequency portions thereof.

11. A method as claimed in claim 10 wherein the step of applying the low frequency signal comprises filtering the program material signal in the region of the low frequency signal.

12. A method as claimed in claim 10 wherein the step of applying the high frequency modulated signal to the program material signal comprises filtering the program material signal in the region of the high frequency modulated signal.

13. A method as claimed in claim 10 wherein the step of applying the low frequency and high frequency modulated signals to the program material comprises eliminating a low frequency band and a high frequency band from the program material signal, and adding the low and high frequency signals to the program material signal in said bands.

14. A method as claimed in claim 10 wherein the low frequency signal is a frame change synchronizing signal.

15. A method as claimed in claim 10 wherein the high frequency signal is a frame change synchronizing signal.

16. An apparatus for preparing recorded program material which does not interfere with normal playback of the material but which renders detectable any unauthorized copies of the material which are made by conventional magnetic tape recording equipment introducing a phase shift between low and high frequency signals, said apparatus comprising;

means for eliminating a low frequency band of signals from the program material signal;

means for generating and inserting a predetermined low frequency signal in said low frequency band;

means for eliminating a high frequency band of signals from the program material signal;

means for generating a predetermined high frequency signal in the high frequency band;

means for modulating the predetermined high frequency signal with said low frequency signal;

means for inserting the modulated high frequency signal in the high frequency band; and means for recording the program material with the inserted high and low frequency signals;

whereby copying of the recorded material onto magnetic tape will produce on the tape detectable phase shifts between the inserted low frequency signal, and a low frequency signal obtained by demodulating the high frequency signal.

17. Apparatus as claimed in claim 16 further comprising means for modulating the low frequency signal to prevent filtering thereof, the high frequency signal being modulated with the modulated low frequency signal.

18. Apparatus as claimed in claim 16 wherein the high frequency signal is frequency modulated with the low frequency signal.

19. Apparatus as claimed in claim 16 wherein the high frequency signal is amplitude modulated with the low frequency signal.

20. Apparatus as claimed in claim 16 wherein said high and low frequency bands of signals are within the audible passband of the program material.

21. Apparatus as claimed in claim 20 further comprising means for sensing the presence of program materials suitable for audibly masking the inserted low and high frequency signals, and for inserting the low and high frequency signals during such masking program material.

22. Apparatus as claimed in claim 16 wherein the means for inserting the high and low frequency signals comprises means for generating a coded signal carrying preselected information and for inserting the high and low frequency signals in response to the coded signal, whereby the coded information will be communicated in the form of recognizable phase shifts to the tape copy to identify the origin of the recorded program material.

23. Apparatus as claimed in claim 16 further comprising means for eliminating a second band of high frequency signals from the program material signal; means for generating a second predetermined high frequency signal and for modulating the second high frequency signal with the low frequency signal, and means for inserting the modulated second high frequency signal in the second high frequency band.

24. Apparatus as claimed in claim 16 wherein the low frequency signal is in the vicinity of 1,000 Hertz or above.

25. Apparatus for preparing recorded program material which does not interfere with normal playback of the material but which renders detectable any unauthorized copies of the material which are made by conventional magnetic tape recording equipment introducing a phase shift between low and high frequency signals, said method comprising:

means for generating a predetermined low frequency signal;

means for generating high frequency signal modulated by said low frequency signal; and means for applying the low frequency signal and high frequency modulated signal to the program material signal to obtain phase related high and low frequency portions thereof to be recorded;

whereby copying of the recorded material onto magnetic tape will produce on the tape detectable phase shifts between the high and low frequency portions thereof.

26. Apparatus as claimed in claim 25 wherein the means for applying the low frequency signal comprises means for filtering the program material signal in the region of the low frequency signal.

27. Apparatus as claimed in claim 25 wherein the means for applying the high frequency modulated signal to the program material signal comprises means for filtering the program material signal in the region of the high frequency modulated signal.

28. Apparatus as claimed in claim 25 wherein the means for applying the low frequency and high frequency modulated signals to the program material comprises means for eliminating a low frequency band and a high frequency band from the program material signal, and means for adding the low and high frequency signals to the program material signal in said bands.

29. A method for analyzing a magnetic tape recording to detect copying from an original recording of program material prepared by applying a low frequency signal and a high frequency signal, modulated with the low frequency signal, to the program material, said method comprising:

recovering the signal recorded upon the magnetic tape recording;

filtering the recovered material to obtain the high frequency signal and the low frequency signal;

demodulating the high frequency signal; and comparing the phase of the low frequency signal with the phase of the low frequency signals obtained from the demodulated high frequency signal to detect phase shifts therebetween arising upon duplication by magnetic tape recording with conventional equipment.

30. A method as claimed in claim 29 wherein the step of comparing signals comprises applying the signals to the horizontal and vertical deflection means of a cathode ray tube device, whereby phase shifts will appear with characteristic traces.

31. A method as claimed in claim 29 further comprising applying the high frequency filtered signal to a phase locked loop operating at the frequency of the inserted high frequency signal, and applying the low frequency filtered signal to a phase locked loop operating at the frequency of the low frequency inserted signal, and using the outputs of the phase locked loops for comparing signal phases.

32. A method as claimed in claim 29 wherein the high and low frequency signals were inserted in the original recording on an intermittent basis, wherein the step of comparing signals comprises applying the signals to the deflection plates of a cathode ray tube device to produce characteristic traces therein representing phase shifts, and further comprising sensing the presence of the inserted signals and blanking the cathode ray tube device when the inserted signals are not present, whereby the cathode ray tube device will show only the phase comparison of the inserted signals.

33. Apparatus for analyzing a magnetic tape recording to detect copying from an original recording of program material by applying a low frequency signal and a high frequency signal, modulated with the low frequency signal, to the program material, said apparatus comprising:

means for recovering the signal recorded upon the magnetic tape recording;

means for filtering the recovered material to obtain the high frequency signal and the low frequency signal;

means for demodulating the high frequency signal; and means for comparing the phase of the low frequency signal with the phase of the low frequency signal obtained from the demodulated high frequency signal to detect phase shifts therebetween arising upon duplication by magnetic tape recording with conventional equipment.

34. Apparatus as claimed in claim 33 wherein the means for comparing signals applies the signals to the horizontal and vertical deflection means of a cathode ray tube device, whereby phase shifts will appear with characteristic traces.

35. Apparatus as claimed in claim 33 further comprising means for applying the high frequency signal to a phase locked loop operating at the frequency of the inserted high frequency signal, and means for applying the low frequency signal to a phase locked loop operating at the frequency of the low frequency inserted signal, the outputs of the phase locked loops being used for comparing signal phases.

36. Apparatus as claimed in claim 33 wherein the high and low frequency signals were inserted in the original recording on an intermittent basis, wherein the means for comparing signals applies the signals to the deflection plates of a cathode ray tube device to produce characteristic traces therein representing phase shifts, and wherein the apparatus further comprises means for sensing the presence of the inserted signals and for blanking the cathode ray tube device when the inserted signals are not present, whereby the cathode ray tube device will show only the phase comparison of the inserted signals.

37. The method for recording program material upon a first magnetic recording tape which does not interfere with normal playback of the recorded program material on said first tape but which renders detectable any unauthorized copy of such recorded program material onto a second magnetic recording tape by conventional magnetic tape recording equipment introducing a phase shift between low and high frequency signals recorded on said second tape, said method comprising the steps of:

passing the program material to be recorded through a controllable high-frequency filter prior to recording of the program material upon the first magnetic recording tape, sensing the presence of a low frequency signal component of the program material to be recorded, sensing when there is a high frequency signal component of the program material to be recorded occurring at a time when said low frequency signal component is simultaneously occurring in the program material to be recorded, and using said low frequency signal component to control said filter for amplitude modulating said high frequency signal component at the frequency of said low frequency signal component, thereby to produce phase-related high and low frequency components of the program material being recorded upon said first magnetic recording tape, whereby any unauthorized copy of said recorded program material which is made upon a second magnetic recording tape by usage of conventional magnetic tape recording equipment can be detected by sensing the phase shift which has been produced between said phase-related high and low frequency components of the program material.

38. The method for recording program material upon a first magnetic recording tape which does not interfere with normal playback of the recorded program material on said first tape but which renders detectable any unauthorized copy of said recorded material onto a second magnetic recording tape made by conventional magnetic tape recording equipment, said method comprising the steps of:

generating a predetermined low frequency signal;

generating a predetermined high frequency signal;

modulating said high frequency signal by said low frequency signal;

simultaneously recording said low frequency signal and said modulated high frequency signal upon the first magnetic tape on which the recorded material is also recorded for providing related high and low frequency signal components which are in phase with each other as recorded on the first magnetic tape, whereby an unauthorized copy of the recorded material made onto a second magnetic recording tape by conventional magnetic recording equipment becomes detectable by virtue of the phase shift which is introduced between said related high and low frequency components as recorded on the second magnetic recording tape.

39. The method for recording program material upon a first magnetic recording tape as claimed in Claim 38, including the steps of:

modulating the low frequency signal by a lower frequency signal to produce a resultant modulated low frequency signal, modulating said high frequency signal by the resultant modulated low frequency signal, and simultaneously recording said resultant modulated low frequency signal and the high frequency signal which was modulated thereby upon the first magnetic tape, whereby to prevent a prospective unauthorized copier from removing such recorded signals from any unauthorized copy which is made.

* * * * *